United States Patent
Raatikainen et al.

(10) Patent No.: US 11,461,073 B2
(45) Date of Patent: Oct. 4, 2022

(54) LOUDSPEAKER AND LOUDSPEAKER CONTROL SYSTEM

(71) Applicant: Genelec Oy, Iisalmi (FI)

(72) Inventors: Kimmo Raatikainen, Iisalmi (FI); Jussi Tikkanen, Iisalmi (FI); Marko Koponen, Iisalmi (FI); Juha Urhonen, Iisalmi (FI); Kari Pöyhönen, Iisalmi (FI)

(73) Assignee: Genelec Oy, Iisalmi (FI)

( * ) Notice: Subject to any disclaimer, the term of this patent is extended or adjusted under 35 U.S.C. 154(b) by 0 days.

(21) Appl. No.: 17/098,481

(22) Filed: Nov. 16, 2020

(65) Prior Publication Data

US 2021/0149621 A1  May 20, 2021

(30) Foreign Application Priority Data

Nov. 15, 2019  (FI) ..................... 20195978

(51) Int. Cl.
*G06F 3/16* (2006.01)
*G06F 21/44* (2013.01)
(Continued)

(52) U.S. Cl.
CPC .............. *G06F 3/165* (2013.01); *G06F 21/44* (2013.01); *H04R 1/403* (2013.01); *H04R 3/04* (2013.01);
(Continued)

(58) Field of Classification Search
CPC ......... G06F 3/165; G06F 21/44; H04R 1/403; H04R 3/04; H04R 3/12; H04R 27/00; H04R 2227/003; H04R 2420/09
See application file for complete search history.

(56) References Cited

U.S. PATENT DOCUMENTS 8,767,733 B2 * 7/2014 Bijwaard .............. H04L 12/185
709/227
2005/0032575 A1   2/2005 Goforth et al.
(Continued)

FOREIGN PATENT DOCUMENTS

CN   109151660 A   1/2019
DE   102005054586 A1   5/2007
(Continued)

OTHER PUBLICATIONS

AES67-2018: AES standard for audio applications of networks—High-performance streaming audio-over-IP interoperability. Audio Engineering Society, 2013. Apr. 15, 2018, pp. 14-25, 33-34, 38.
(Continued)

*Primary Examiner* — Joseph Saunders, Jr.
(74) *Attorney, Agent, or Firm* — Laine IP Oy

(57) ABSTRACT

According to an example aspect of the present invention, there is provided A controllable loudspeaker, the loudspeaker comprising a speaker element and a digital signal processor comprising at least one processing core and at least one memory including computer program code, the at least one memory and the computer program code being configured to receive a multicasted control signal, alter the behavior of the loudspeaker in response to the said control signal, wherein the altering of the behavior comprises applying settings stored in the memory of the digital signal processor of the loudspeaker.

18 Claims, 10 Drawing Sheets

(51) Int. Cl.
  *H04R 1/40* (2006.01)
  *H04R 3/04* (2006.01)
  *H04R 3/12* (2006.01)
  *H04R 27/00* (2006.01)

(52) U.S. Cl.
  CPC .............. *H04R 3/12* (2013.01); *H04R 27/00* (2013.01); *H04R 2227/003* (2013.01); *H04R 2420/09* (2013.01)

(56) References Cited

U.S. PATENT DOCUMENTS

| | | | |
|---|---|---|---|
| 2007/0136768 A1* | 6/2007 | Kumar | H04N 5/23293 725/81 |
| 2009/0313659 A1 | 12/2009 | Samuels | |
| 2013/0223658 A1 | 8/2013 | Betlehem et al. | |
| 2013/0251174 A1 | 9/2013 | Lambourne | |
| 2014/0098713 A1 | 4/2014 | Beckhardt et al. | |
| 2015/0125000 A1* | 5/2015 | Makivirta | H03G 5/005 381/103 |
| 2015/0237424 A1* | 8/2015 | Wilker | H04R 1/026 381/150 |
| 2016/0253145 A1 | 9/2016 | Lee et al. | |
| 2017/0295167 A1* | 10/2017 | Robinson | H04L 9/3213 |
| 2018/0359574 A1* | 12/2018 | Meier | G06F 40/58 |
| 2018/0359581 A1 | 12/2018 | Mäkivirta et al. | |

FOREIGN PATENT DOCUMENTS

| | | |
|---|---|---|
| EP | 2216974 A1 | 8/2010 |
| EP | 2475193 A1 | 7/2012 |
| JP | 2005150880 A | 6/2005 |
| JP | 2016528757 A | 9/2016 |

OTHER PUBLICATIONS

Boucadair et al: Universal Plug and Play (UPnP) Internet Gateway Device—Port Control Protocol Interworking Function (IGD-PCP IWF). Internet Engineering Task Force (IETF). Request for Comments: 6970. Category: Standards Track. ISSN: 2070-1721, Jul. 2013.

Sales et al: A UPnP extension for enabling user authentication and authorization in pervasive systems. J Braz Comput Soc, Oct. 7, 2010, vol. 16, pp. 261-277.

ZHI: Several Ways of Forming a Multi-Zone Music System in the Home. Practical Audio-Visual Technology, Dec. 31, 2006, pp. 24-29.

* cited by examiner

LOUDSPEAKER AND LOUDSPEAKER CONTROL SYSTEM

FIELD

This disclosure provides a loudspeaker control system and method, in particular in the field of audio engineering applications.

BACKGROUND

Typical audio systems comprising multiple speakers are difficult to control remotely on the level of an individual speaker. In addition, adding speakers to such a system may be difficult, requiring reconfiguration of both hardware and software. Systems comprising multiple speakers in a large area may not allow for controlling or adjusting a subset of speakers, for example only some speakers within a room. Typically, the control is provided on a system-wide level or on a room level. However, in order to negate the effects of the listening space on the audio output of an audio system, advanced speaker-level configuration may be required to obtain an essentially flat response. In previous systems, such control may not have been possible remotely from a central location. In some systems, control may have required adjustment of physical switches located on the enclosures of the individual loudspeakers, which is burdensome if the system has a large number of speakers.

SUMMARY OF THE INVENTION

The invention is defined by the features of the independent claims. Some specific embodiments are defined in the dependent claims.

According to a first aspect of the present disclosure, there is provided a controllable loudspeaker, the loudspeaker comprising a speaker element and a digital signal processor comprising at least one processing core and at least one memory including computer program code, the at least one memory and the computer program code being configured to receive a multicasted control signal, alter the behavior of the loudspeaker in response to the said control signal, wherein the altering of the behavior comprises applying settings stored in the memory of the digital signal processor of the loudspeaker.

According to a second aspect of the present disclosure, there is provided a control apparatus comprising at least one processing core and at least one memory including computer program code, the at least one memory and the computer program code being configured to multicast a control signal to at least one loudspeaker, said loudspeaker being configured to at least receive said multicasted control signal, and alter its behavior in response to the said control signal, wherein the altering of the behavior comprises applying settings stored in the memory of the digital signal processor of the loudspeaker.

According to a third aspect of the present disclosure, there is provided a method for controlling loudspeakers, the method comprising using a control apparatus, multicasting at least one control signal, receiving said multicasted control signal in at least one loudspeaker, wherein the at least one loudspeaker is configured to alter its behavior in response to the at least one control signal, wherein the altering of the behavior comprises applying settings stored in the memory of the digital signal processor of the loudspeaker.

According to a fourth aspect of the present disclosure, there is provided the method of the third aspect using the speaker of the first aspect and the control apparatus of the second aspect.

EMBODIMENTS

Figure 1A:
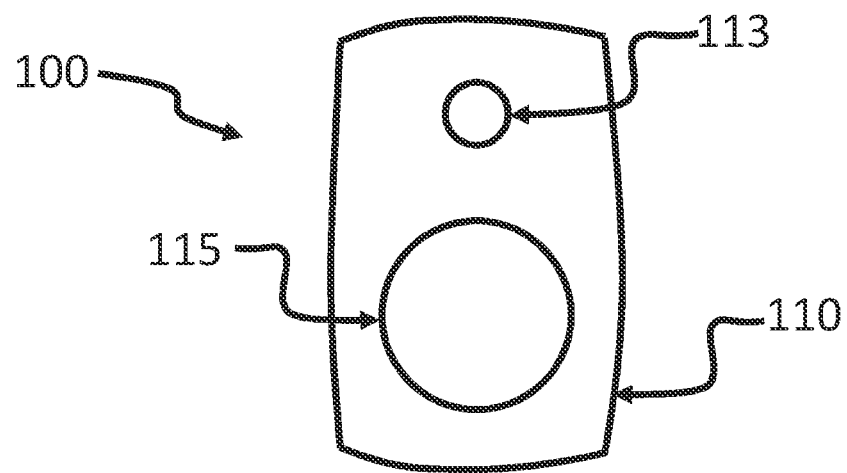
FIGS. 1A and 1B illustrate a schematic view of an exemplary loudspeaker in accordance with at least some embodiments of the present disclosure.

The present disclosure provides a solution for controlling audio devices within an audio system by use of an audio network and a control apparatus. The control apparatus may be used to multicast commands to all devices within the network or selectively multicast to subgroups of devices. As the commands may alter the behaviour of the devices, the flexibility provided by the described solution allows for efficient operation of the audio system including use of third party devices. The present solution provides a scalable solution for controlling multiple speakers up to hundreds without increased difficulty of configuration and control.

In at least some of the embodiments within the present disclosure, devices are formed into a network for control purposes. Said devices may comprise audio devices such as loudspeakers and microphones, network devices such as routers and hubs, and other computing devices such as personal computers and smartphones, or any other suitable device including the devices listed later within this disclosure. The network may be termed an audio network and it may be controlled by at least one control system.

In at least some of the embodiments within the present disclosure, so-called third party devices may be used. The term third party device is used to refer to a device which may fulfil at least one of the following conditions: the third party device may have a different manufacturer than the audio network or a majority of devices within the audio network, the third party device may be a handheld device, the third party device may be not always present within the network but is connected when needed, the third party device may be an additional or alternative control apparatus.

In at least some of the embodiments within the present disclosure, the electrical power and audio signal are conveyed to loudspeakers via a single cable. In at least some of the embodiments, means in accordance with power over Ethernet (POE) are used. In the context of the present disclosure, POE comprises at least one of the following standards or types: 802.3af (802.3at Type 1) "PoE" 12.95 W; 802.3at Type 2 "PoE+" 25.5 W; 802.3bt Type 3 "4PPoE" 51 W; 802.3bt Type 4 71 W.

Elements of a control system in accordance with the present disclosure may comprise at least one of the following: POE switch, POE injector, network connection means such as network cables, AOIP streamer, analog input source.

Networks within the present disclosure, including audio networks, may comprise at least one of the following: local area network, LAN over Ethernet, or any other suitable network technologies including technologies listed later within this disclosure. Said networks may utilize dynamic host configuration protocol, DHCP, in order to assign network addresses. In addition, said networks may be split into multiple subnets by at least control apparatus, in accordance with IPv4 or IPv6, Internet Protocol version 4 or version 6. Said splitting may be done automatically subject to the control apparatus configuration. Splitting the network into subnets has the beneficial effect of less congestion, i.e. fewer packets, on a single subnet. A similar technical solution without using different subnetworks can be achieved in at least some embodiments of the present disclosure by managing port assignments of devices, i.e. by having different devices within the network listen and transmit, using different ports from one another. This has the beneficial effect of reducing the amount of packets individual devices have to parse.

A control system in accordance with the present disclosure may comprise one or more zones. In the context of this disclosure, a zone is defined as a set or subgroup which is comprised of at least one device, preferably several devices. In an exemplary embodiment, each device may belong to at least one zone. A zone allows a set of devices to be controlled with a single action, i.e. changes or control decisions performed on the zone will affect all devices within the zone. For example, volume control and zone-level profile selection are control decisions affecting a zone.

Devices such as loudspeakers have control settings, which are settings affecting the device operation. Control settings may have specific values, which may be numerical, alpha-numerical or logical. Control settings may comprise at least some of the following: activate device profile, volume value such as frequency or band-specific volume values, gain values such as frequency or band-specific gain values, mix mode, audio over internet protocol input settings, AoIP, room correction filters, delay, network address, network port, zone that device belongs to. Other information relating to the device may comprise at least some of the following: device name, device type. Control settings may be adjusted either using absolute values or relative values. An example of an absolute value adjustment is setting the volume of a loudspeaker to −30 dB, decibels. An example of a relative value adjustment is increasing the volume level by +3 dB. Control settings may comprise at least a part of a control signal, control message, packet or packet payload.

In at least some of the embodiments of this disclosure, diagnostic information may be stored within a device. In a further exemplary embodiment, in a loudspeaker the diagnostic information may be stored within a memory associated with the digital signal processor. Diagnostic information may comprise at least one of the following: device name, device configuration, device zone, device IP address, network data including addresses of other devices, audio level, current control setting values, control setting values stored within profiles, data relating to user identification, use history, current profile, data relating to the network interface such as network statistics and speed, information relating to the audio over internet protocol stream such as speed, packet loss, error messages. Diagnostic information may comprise at least a part of a control signal, control message, packet or packet payload.

In at least some embodiments in accordance with the present solution, profiles may be used to store multiple settings. Such profiles may be a device profile, a zone profile or a system-level profile. A device profile may comprise multiple control setting values. A device profile is stored within the device. Therefore, activating a device profile or switching from one device profile to another may have a dramatic effect on the device performance. An exemplary device profile could be "use as front speaker" with appropriate volume and delay settings. In a beneficial further embodiment, at least one device profile may comprise settings obtained via a factory calibration process, wherein the calibration is done in conditions similar to an anechoic chamber to achieve a high degree of accuracy in the calibration. A device profile may comprise at least one of the following: a delay setting, a frequency range volume setting, a mix mode setting, a room correction filter, a lowpass filter, a high pass filter, a notch shelving filter, a wide bandwidth roll-off using one or more shelving filters, a first-order filter function, a second-order filter function. A roll-off means that the response is adjusted to form a slope, e.g. to zero, starting or ending at the desired frequency. Shelving filters may be first-order filter functions which alter the relative gains between frequencies much higher and much lower than the cutoff frequencies, or they may be parametric, with one or more sections implementing a second-order filter. A low shelf is adjusted to affect the gain of lower frequencies while having no effect well above its cutoff frequency. A high shelf adjusts the gain of higher frequencies only. A parametric shelving filter, on the other hand, has one or more sections each of which implements a second-order filter function. This involves at least three arguments; the center frequency, the Q, and the gain which determines how much those frequencies are boosted or cut relative to frequencies much above or below the center frequency selected.

An audio system may have several different use cases, i.e. required uses. For example, an audio system for personal use within a living room may be required to be used in stereo mode if the user desires to listen to music, or surround sound may be required if the user is enjoying a cinematic experience. Likewise, in a sound mixing studio or event space different use cases are typically required vis-à-vis the audio system. The present disclosure provides a solution to activate or alternate through different use cases via system-level profiles. A system-level profile is stored within the control apparatus and comprises a relationship table of which speakers use which device profiles. In the system-level profile, at least some speakers may have device profiles reflecting the following: inactivity, restriction to certain bandwidths, delay and frequency settings. After a system-level profile is created via the control apparatus, the device profiles are updated within the devices to reflect the system-level profile. For example, if system-level profile 99 is intended for surround sound, the profiles 99 within each device will comprise a volume setting consistent with surround sound. In accordance with at least some embodiments of the present disclosure, zone-level profiles may also be used, said zone-level profiles being similar to system-level profiles but limited to devices within a zone. In at least some embodiments of the present disclosure, profiles are created via at least one of the following: via using the control apparatus, during manufacture, automatically upon device joining the audio network.

Therefore, the present disclosure provides an apparatus and method for controlling an audio system comprising a plurality of speakers, which may be arranged in different physical spaces and further into different zones, each device or zone being adjustable independently using the control apparatus or a third party device. Newly added speakers may be added to the network automatically as disclosed with respect to FIG. 4A. Initial configuration of speakers is also provided for in manual, semiautomatic and fully automated modes, which reduces the amount of manual work required for system configuration and reduces the possibility of human error in the configuration.

In at least some of the embodiments in accordance with this disclosure, authentication methods are used to prevent unauthorized control of the devices. Any suitable authentication methods may be used including the following: asymmetric cryptography, advanced encryption standard, AES, Rivest-Shamir-Adleman, RSA.

Figure 1B:
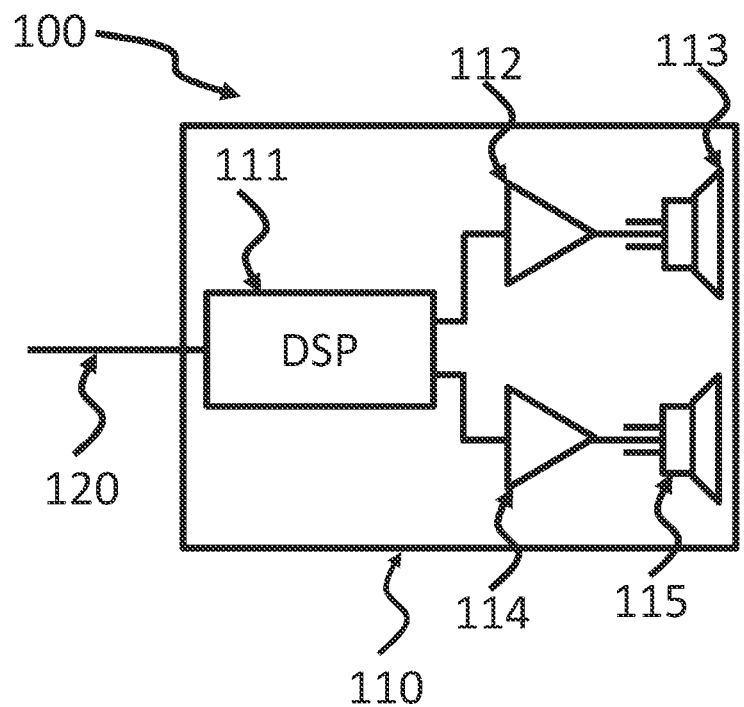

FIGS. 1A and 1B illustrate a schematic view of an exemplary loudspeaker in accordance with at least some embodiments of the present disclosure. A loudspeaker may comprise at least one audio over IP, AOIP, channel, an analog input port, POE power and a processor core configured to allow control of the loudspeaker over an IP network.

The loudspeaker 100 comprises enclosure 110, first loudspeaker element 115 and second loudspeaker element 113. In a further exemplary embodiment, the first loudspeaker element is a woofer-type element and the second loudspeaker element is a tweeter-type element.

The loudspeaker 100 further comprises a digital signal processor, DSP 111, and one or more amplifiers, 112 and 114 as well as input port 120. Amplifiers may be associated with a specific loudspeaker element such as the amplifier 112 is used for speaker element 113 and the amplifier 114 is used for speaker element 115. The digital signal processor 111 comprises a processor core and memory, wherein the memory stores instructions to allow the digital signal processor to carry out operations related to the invention as well as settings and diagnostic data relating to the loudspeaker. The loudspeaker 100 may be powered via conventional means such as via an external or internal power supply providing alternating current or direct current, or the power may be beneficially arranged via Power over Ethernet, POE, use of which simplifies the installation process of the loudspeaker by reducing the number of cables needed for the loudspeaker operation. For the sake of clarity, the power supply is not shown within FIG. 1A or 1B.

Figure 2:
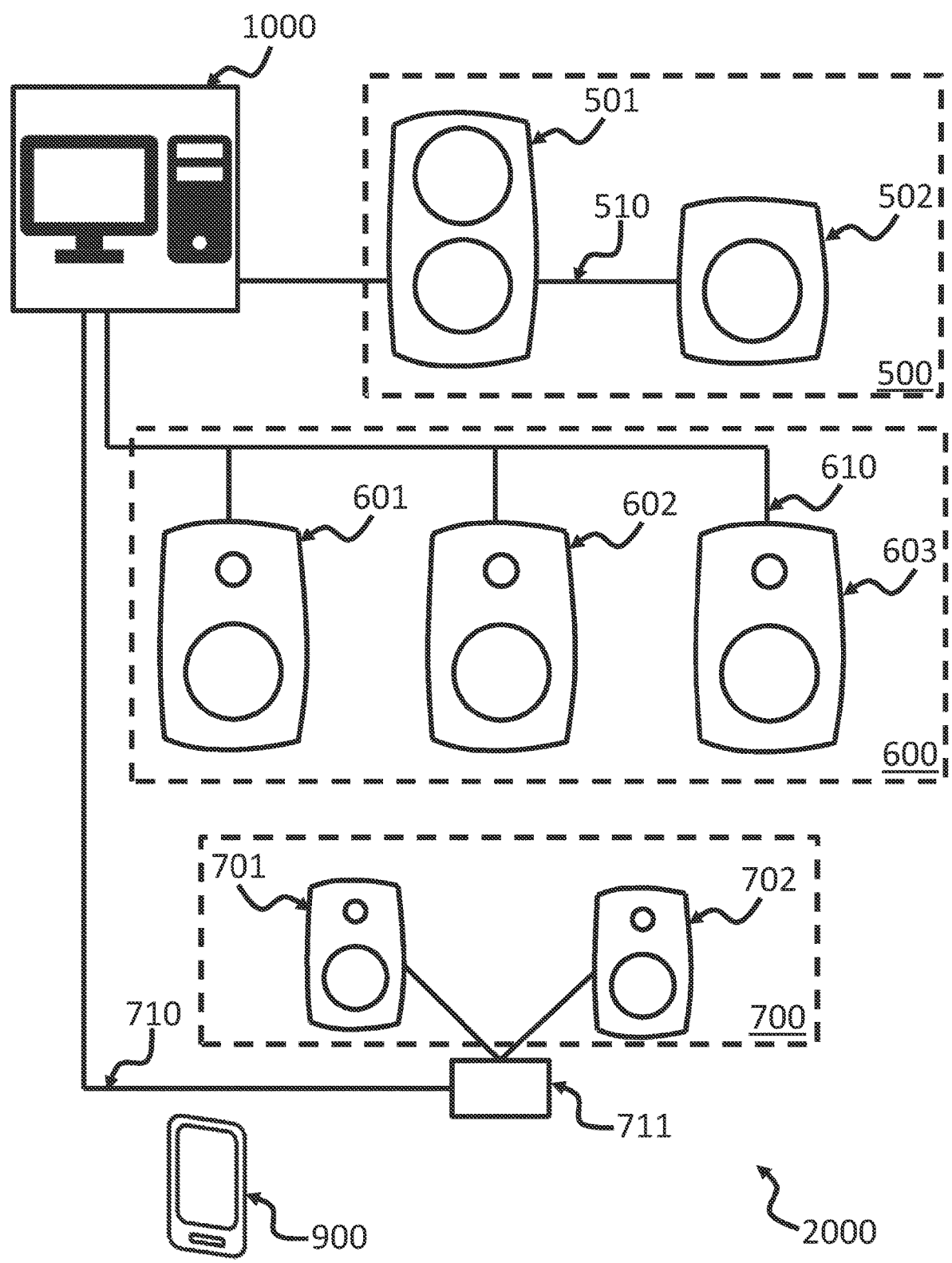
FIG. 2 illustrates a schematic view of an exemplary loudspeaker system capable of supporting at least some embodiments of the present disclosure.

FIG. 2 illustrates a schematic view of an exemplary loudspeaker system 2000 capable of supporting at least some embodiments of the present disclosure. The loudspeaker system is controlled at least in the setup phase by control device 1000. Control apparatus 1000 comprises a processor core and memory, wherein the memory stores instructions to allow the digital signal processor to carry out operations related to the invention. Control apparatus 1000 may be at least one of the following: a personal computer, PC, or a tablet computer, or a mobile device such as a smartphone, or indeed any other suitable device, including devices listed later within this disclosure. Control apparatus 1000 also comprises means for network communication such as a network adapter or other suitable device, which is usable for sending and receiving information packets such as Transmission Control Protocol, TCP, and User Datagram Protocol, UDP.

Loudspeaker system 2000 comprises control apparatus 1000, devices such as loudspeakers 501, 502 which are connected by connection means 510, loudspeakers 601, 602, 603 which are connected by connection means 610, loudspeakers 701, 702 which are connected by connection means 710 and hub or router 711. In a further exemplary embodiment, the system 2000 also comprises third party device 900, which may be at least one of the following: a personal computer, PC, or a tablet computer, or a mobile device such as a smartphone, or indeed any other suitable device, including devices listed later within this disclosure. Devices within the system 2000 may comprise loudspeakers, microphones, calibration devices, televisions, or any suitable device including the devices listed within this disclosure. Third party devices, such as device 900 or device 901, may connect to the audio network using any suitable wireless or wired technologies, including technologies listed within this disclosure.

The loudspeakers within speaker system 2000 may be identical with respect to one another, such as loudspeakers 601, 602, 603, or they may be different types of loudspeakers such as loudspeakers 501 and 502. Loudspeakers or loudspeaker groups may be connected to the control system and/or one another by various suitable means, such as the passthrough or daisy chain connection of connection 510, the tree structure of connection 610, or using a hub or router 711 as part of connection 710. The physical connection may be done using cables such as copper cable, coaxial cable, Ethernet cable using RJ-45, 8P8C jacks, or any cable in accordance with ISO/IEC 11801 such as at least one of the following: U/UTP, F/UTP, U/FTP, SF/UTP, S/FTP, wherein U is unshielded, F is foil shielding, TP is twisted pair and S is braided shielding of the outer layer only. Using a shielded twisted pair cable has the beneficial effect of reducing electromagnetic interference, EMI, both from and to the cable, leading to improved signal quality. Alternatively or additionally, the system may use any suitable wireless communication technology for communication, including technologies listed within this disclosure.

Within speaker system 2000, devices (including loudspeakers) may be arranged into zones such as zones 500, 600, 700. As previously disclosed herein, a zone is a set of devices. A zone is not limited to physical groupings of the devices, e.g. all of the loudspeakers within a room, but instead is freely selectable by the user. For example, a zone could consist of all of the speakers of a certain type within a space comprised of multiple rooms. Another example would be a zone comprised of the speakers situated on the left side of multiple rooms, which would allow controlling the left-side speakers of all of the rooms at once. Zones may be set up by the user via the control apparatus, or additionally or alternatively the control apparatus may be configured to automatically assign devices into zones based on criteria such as device name, device type, ping of device.

In order to control the devices, control apparatus 1000 transmits at least one packet, preferably a multitude of packets, within the system 2000. Via the at least one packet, the control apparatus may transmit instructions comprising at least the following: read information from the devices, write changes to the device settings, execute files within the devices. Exemplary instructions are a command to change a value, a request for diagnostic information and a command to activate a device profile. Beneficially, the packets are multicast, which means that the packets are sent to each address within a network or to a range of addresses. A multicast may be accomplished by sending the packet to a so-called multicast address of a network or subnet. In accordance with the present disclosure, transmission of packets to single zones is accomplished via having separate subnetworks for each zone, using a specific port for each zone, or a for each zone a combination of a specific network and a specific port.

The packets are received by at least some of the devices within the system. In a further exemplary embodiment, the packets are retransmitted by the devices according to certain criteria, such as time to live, TTL. Upon receiving a packet, the device may perform at least a first determination regarding the packet. The first determination may comprise at least one of the following: determining if the packet is addressed to the determining device, determining if the packet is addressed to a zone of which the determining device is a member, identifying the device sending the packet, determining if the device sending the packet has permission to control the determining device.

After the reception of the packet by the at least one device, the device may alter its behaviour in response to the packet. Such alteration may comprise adjusting one or more control values of the device, or activating or deactivating a prestored device profile within the device, rebooting the device, altering communication settings of the device including IP addresses and ports, replying to a diagnostic request. In addition, after receiving a packet, a device may perform at least a first determination, the determination comprising comparison of the device identifier indicated in the packet and the device identifier of the device receiving the packet. If a packet is received by a first device wherein the packet specifies that a different device should alter behaviour and there is no mention of the first device, the first device may determine based on its configuration to not perform the instructions within the packet. In the alternative, the device may be configured in such a way that it complies with all received packets, which reduces the processing cycles required within the device.

In a beneficial further embodiment, the control apparatus 1000 may configure at least one device or zone to allow for control by at least one third-party device, such as device 900. Such control may comprise at least one of the following: audio playback, adjusting settings such as volume or balance, requesting diagnostic information from the devices or altering the behaviour of the device or the devices within the zone by applying settings stored in the memory of the digital signal processor of the loudspeaker. The control level of the third-party device may be granularly defined so that certain functions such as audio playback are restricted from the control of the third-party device. Indeed, different third-party devices may have different permission levels. For example, a certain third-party device may be only allowed to obtain diagnostic data from the loudspeakers within a certain zone. This has the beneficial effect of ensuring that the system functions are not compromised by the third-party devices.

Figure 3:
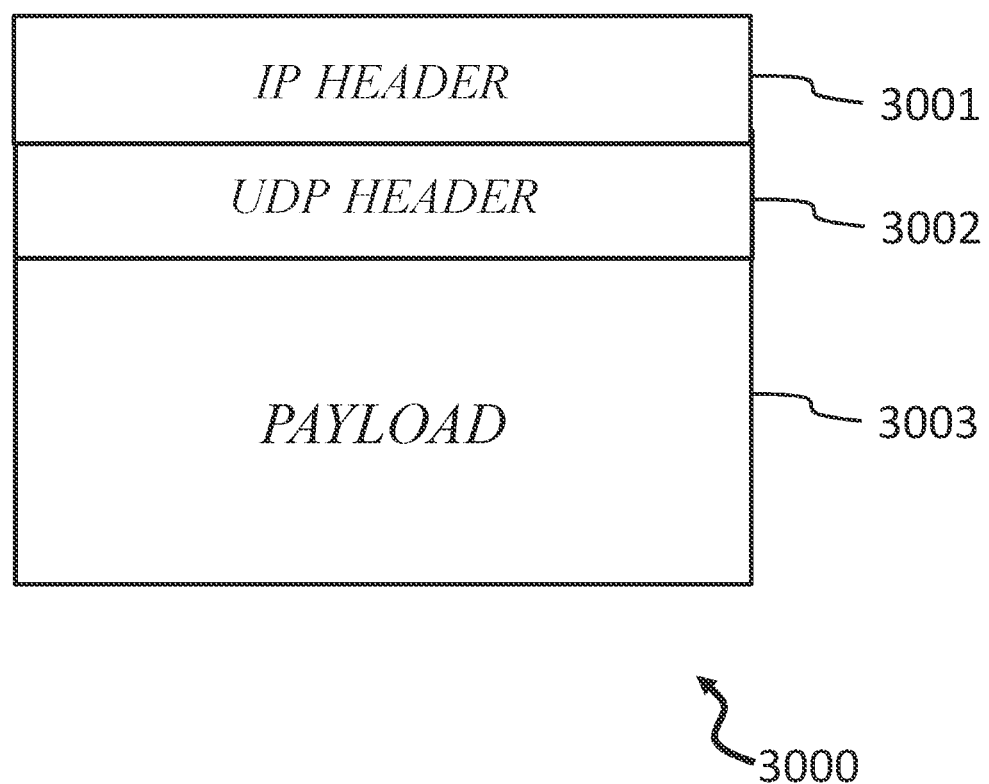
FIG. 3 illustrates an exemplary packet used with at least some of the embodiments of the present disclosure.

FIG. 3 illustrates an exemplary packet usable with at least some of the embodiments of the present disclosure. Packet 3000 may comprise internet protocol, IP, header 3001 and UDP header 3002 as well as payload 3003. Payload 3003 may comprise one or more control signals or control messages. A control signal or control message may comprise at least one of the following: an absolute value adjustment command, a relative value adjustment command, a request for diagnostic information, a command to save the current control settings as a new device profile, a command to activate a device profile, a command to delete a device profile, a command to change the device address or any other appropriate command or request including those listed within this disclosure.

Figure 4A:
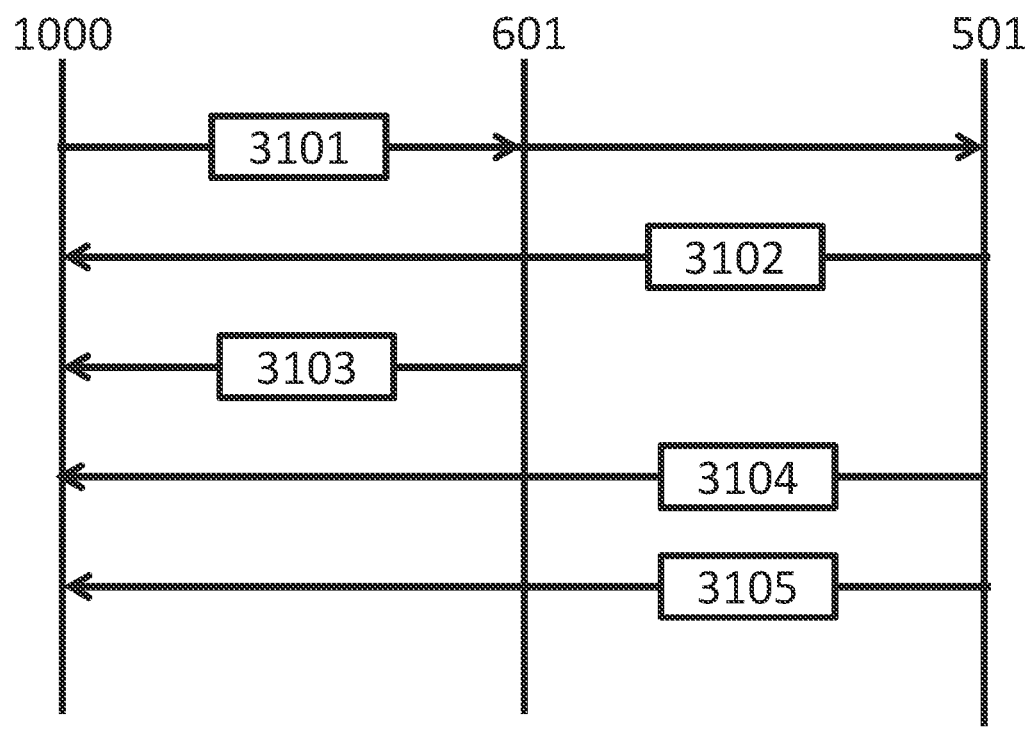
FIGS. 4A and 4B illustrate exemplary sequence diagrams in accordance with least some embodiments of the present disclosure.
Figure 4B:
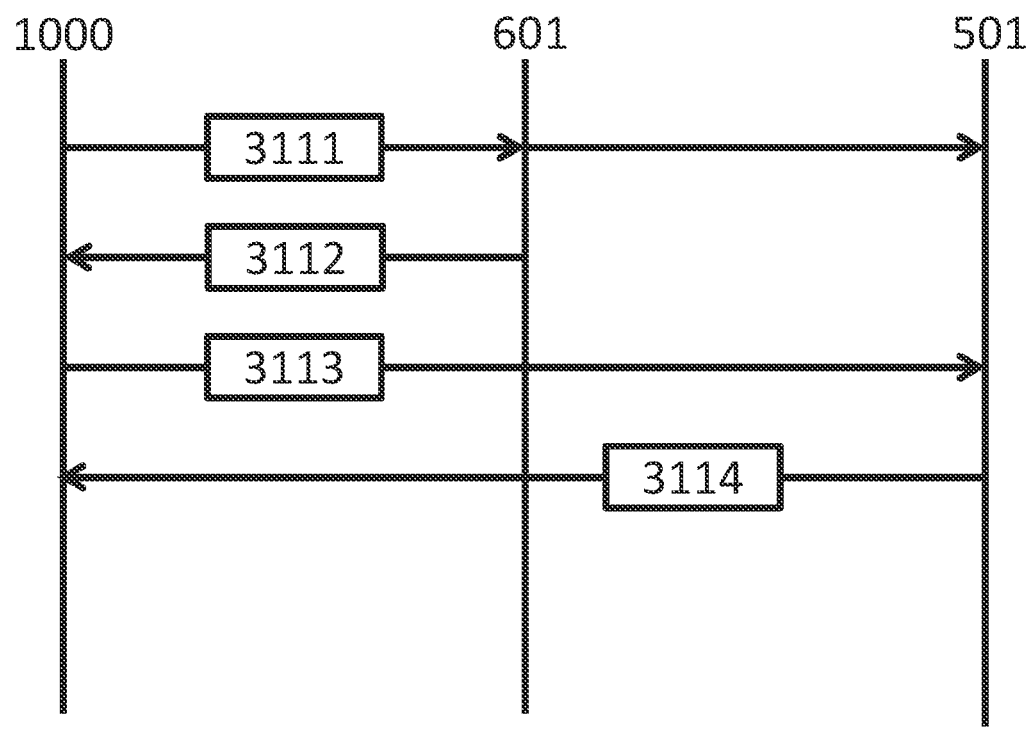

FIGS. 4A and 4B illustrate a non-limiting example sequence diagram in accordance with least some embodiments of the present disclosure. In FIG. 4A, the initial discovery process of the audio network is depicted. In at least some embodiments, the discovery process may be initiated automatically once a device is physically connected to the audio network. In at least some embodiments, the discovery process may utilize the multicast domain name system, mDNS. The discovery process may use a security or authentication process as disclosed later in this disclosure. The control apparatus 1000 multicasts the packet 3101 to all devices on the subnetwork including device 601 and 501 which are depicted in the Figure. The packet 3101 may comprise a request to return a packet comprising the device identifier to the control apparatus 1000. The request may comprise a mDNS request. Both devices 601 and 501 receive the packet 3101. Device 501 replies with packet 3102 which comprises the requested information, in this case the device identifier. Device 601 replies with packet 3103 which comprises the requested information, in this case the device identifier. Packets 3102 and 3103 may comprise an mDNS response. In at least some embodiments, the reply packets 3102 and 3103 may be multicasted. Upon receiving the packets 3101 and 3102, the control apparatus 1000 stores the device identifiers. Control apparatus 1000 may use the information obtained through discovery and metadata within the packet, e.g. within the packet headers, to create a map of the audio network. Control apparatus 1000 may also create a visual representation of the map which is displayed to the user via a graphical user interface, GUI.

In an exemplary embodiment, device 501 may further reply to the request 3101 after the initial response 3102 by using packets 3104 and 3105. Packet 3104 may comprise the network and zone information of device 501 and the packet 3105 may comprise the device profile information of device 501. Replying with multiple packets has the benefit of avoiding excessive packet size and requiring fewer resources on the control apparatus to parse the packets. Device 601 may reply in a similar manner, though this is omitted from the diagram for the sake of clarity.

In FIG. 4B, the process of assigning devices to zones is illustrated. Control apparatus 1000 multicasts a packet 3111, which is received by devices 601 and 501. In this example, the packet 3111 comprises an instruction for device 601 to change to zone 10. Device 601 changes to zone 10 and replies with packet 3112, which may comprise an acknowledgement message comprising the zone identifier 10. Next, the control apparatus multicasts a packet 3113 which comprises an instruction for device 501 to change to zone 18. Device 501 changes to zone 18 and replies with packet 3114, which may comprise an acknowledgement message comprising the zone identifier 18. In a situation where the zone of device 501 was already zone 18, the reply packet 3114 would still comprise an acknowledgement message comprising the zone identifier 18. Subject to the network settings of the audio network, which are defined within the control apparatus 1000, the multicasted packet 3113 is either received and not acted upon by device 601, as it is not the intended recipient, or in the alternative the zone 10 and zone 18 are on different subnetworks or use different ports, wherein the device 601 does not receive packet 3114.

Figure 5A:
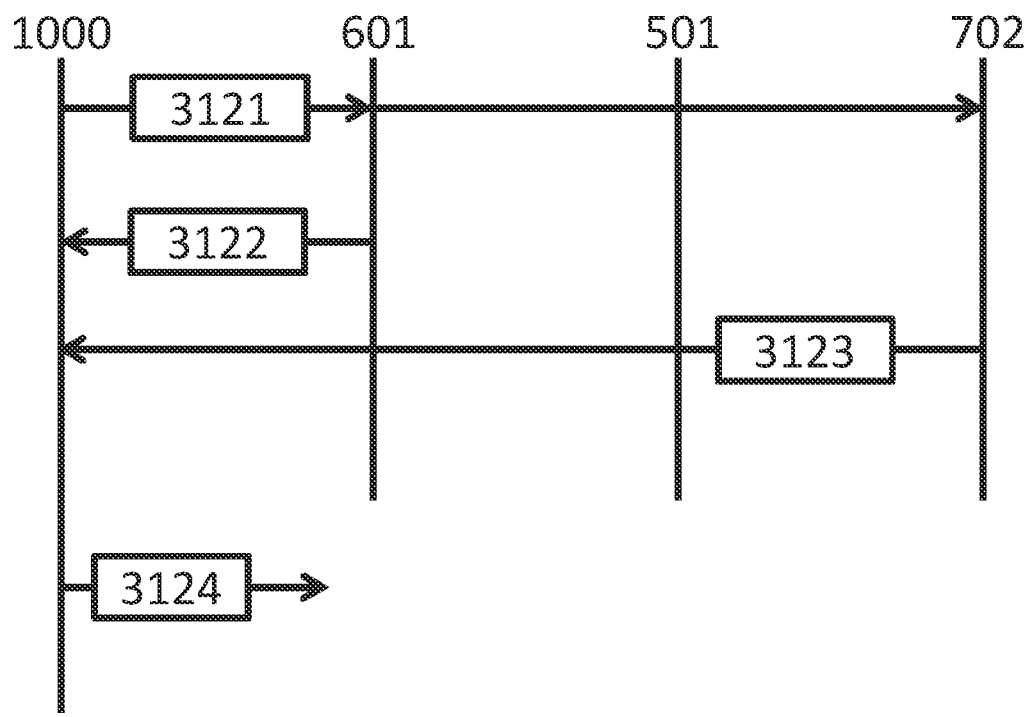
FIGS. 5A and 5B illustrate exemplary sequence diagrams in accordance with least some embodiments of the present disclosure.
Figure 5B:
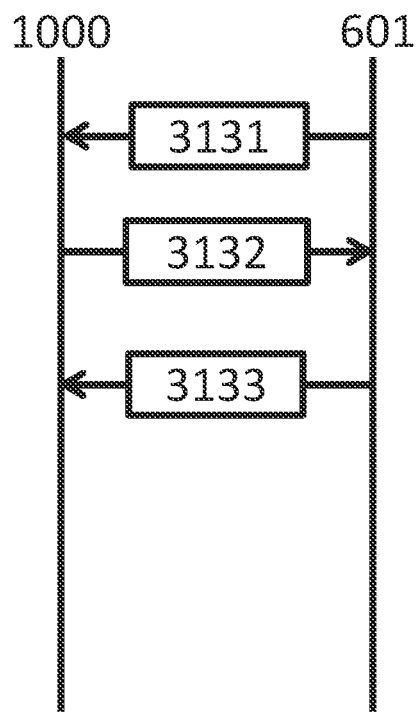

FIGS. 5A and 5B illustrate non-limiting example sequence diagrams in accordance with least some embodiments of the present disclosure. In FIG. 5A, the audio network is comprised of the control apparatus 1000 and the loudspeakers 601, 501 and 702. In this non-limiting example, the loudspeakers 601 and 702 are in the same zone 23, whereas the loudspeaker 501 is in zone 12. The audio network is further configured so that all devices are on the same network, but each zone uses its own port, such as an UDP port. Control apparatus 1000 multicasts a packet 3121 to the audio network with the port address being the port for zone 23, the packet 3121 comprising a command to set the volume level to −15 dB. Therefore, the packet is received by speakers 601 and 702, as they are listening on the correct port. Speaker 501 does not receive the packet, as it is only listening to the port for zone 12. In response to packet 3121, speakers 601 and 702 respond with packets 3122 and 3123 respectively, said packets comprising the volume level setting. Next, control apparatus 1000 multicasts a packet 3124 to the audio network with the port address being the port for zone 30, the packet 3124 comprising a command to mute the volume of the speaker. As none of the depicted speakers belong the said zone, they do not react to the packet 3124.

In FIG. 5B, an authentication process is depicted which is usable with any embodiment described within this disclosure. The authentication process may take place after the initial packet is sent, e.g. after the reception of any of packets 3103, 3111, 3121 or any packet received by the devices. The authentication process may be repeated with respect to a predefined interval within the device settings, e.g. the process may be repeated every 24 hours. In a non-limiting example of the authentication process, device 601 may respond to an initial packet with a packet 3131, wherein packet 3131 may comprise a security token. The security token may comprise a randomly generated element, which has been generated within device 601. Upon receiving packet 3131, control apparatus encrypts the security token and returns the encrypted token to device 601 in packet 3132. Device 601 then decrypts the security token and compares the decrypted token to the token within packet 3131. If the tokens are not identical, permission is not given to the control apparatus to interact with the device and future packets received will be subject to the authentication process. If the tokens are identical, permission is given to the control apparatus and future packets received will not be subject to the authentication process. In both the above-mentioned cases, the device will respond with packet 3133 indicating the outcome of the authentication process. The control apparatus will then resend the initial packet.

Additionally or alternatively, the authentication process may use asymmetric cryptography as follows. The control apparatus may have both a public and private key, wherein only the public key is usable by device for encrypting the challenge. The control apparatus then decrypts the challenge using the private key and sends the challenge back to the device, wherefore the device may determine that the control apparatus is in possession of the private key and is to be trusted.

Figure 6A:
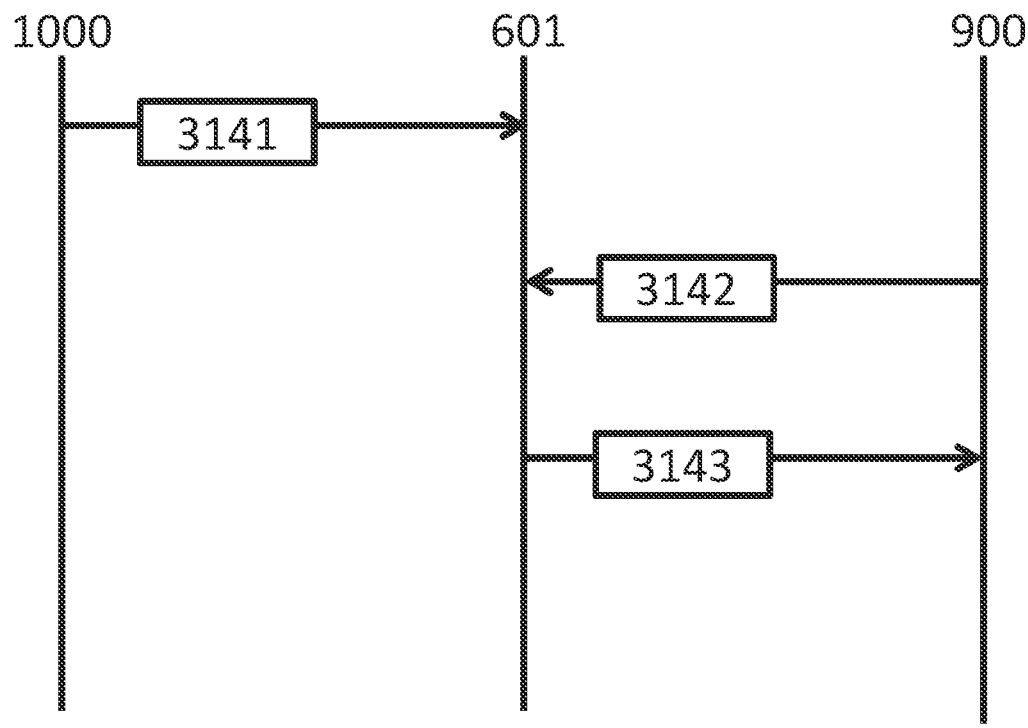
FIGS. 6A and 6B illustrate exemplary sequence diagrams in accordance with least some embodiments of the present disclosure.
Figure 6B:
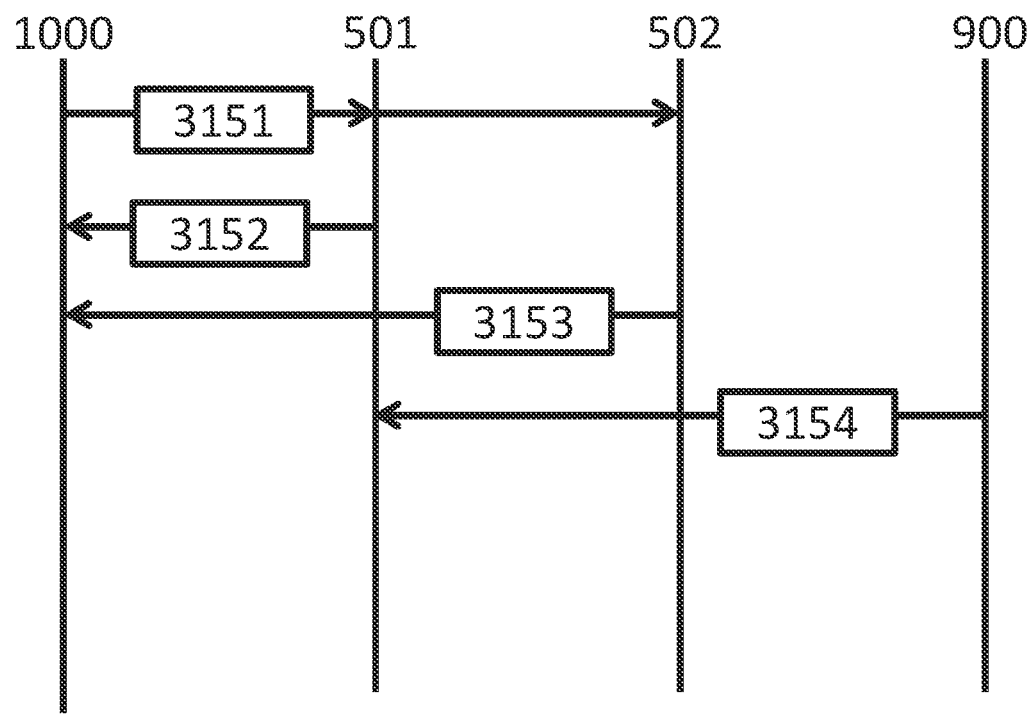

FIGS. 6A and 6B illustrate an example sequence diagram in accordance with least some embodiments of the present disclosure, wherein a third party device is used with the audio network. In FIG. 6A, a process of authorizing a third party device is shown. The process may be initiated by either the control apparatus 1000 or the third party device 900, in FIG. 6A the control apparatus is the initiator. At the start of the process, third party device 900 joins the audio network. The joining of third party device may be subject to any suitable authentication procedures, including those listed within this disclosure as well as: Wi-fi protected access 1, 2, or 3, WPA1, WPA2, WPA3, Transport Layer Security, TLS, Hypertext transfer protocol authentication, HTTP.

In a further optional exemplary embodiment, the third party device connects to the audio network via a wireless access point such as a wireless router. In an exemplary embodiment the control apparatus 1000 may send a initial packet to the third party device 900. The initial packet may comprise at least one of the following: a request to acknowledge the packet, information relating to devices on the network such as names, addresses and ports, communication settings usable by the third party device. In response, third party device replies with a packet, which may comprise acknowledgement of the initial packet.

In the beginning of the third party setup process, control apparatus multicasts packet 3141 to the system, whereupon it may be received by device 601. In a further exemplary embodiment, the packet 3141 may be sent to all devices within a zone. Packet 3141 may comprise at least one of the following: information relating to the third party device such as the network address of said third party device, a permission level with respect to the third party device, new configuration instructions for the receiving device such as new subnet and/or port information. After receiving the packet 3141, device 601 alters its behaviour as per the instructions within the packet 3141. After this, the device is controllable by packets from third party device 900, such as packet 3142. Packet 3142 may comprise at least one of the following: a command to alter behaviour, a request for diagnostic information. Execution of the contents of the packet 3142 by device 601 is subject to the permission level allocated to third party device 900 within device 601 in packet 3141. In the exemplary situation shown in FIG. 6A, the packet 3142 comprises a request for information, which the device 601 provides to the third party device 900 in packet 3143 comprising the requested information.

FIG. 6B shows a situation wherein first the control apparatus 1000 assigns loudspeakers 501 and 502 into a zone. As devices 501 and 502 are already configured to accept third party control, the third party device may control the devices within the zone i.e. devices 501 and 502, simply by multicasting a packet to the port assigned to said zone. Initially, the control apparatus multicasts packet 3151, whereupon it is received by devices 501 and 502. Packet 3151 may comprise instructions that receiving devices are to reassign themselves to zone 10 and set receiving port to 500001. The devices 501 and 502 acknowledge the instructions via packets 3152 and 3153 respectively. Third party device 900 multicasts packet 3154 to the audio network with a specified port of 500001, whereupon the devices 501 and 502 receive packet 3154 and comply with the instructions within.

In at least some of the embodiments presented within this disclosure, and as exemplified by the situation presented by FIG. 6B, the control apparatus may not be needed for the operation of the system after the initial setup of devices and optionally zones and third party devices has been done. Indeed, the present solution is operable even if the control apparatus is powered down or removed from the audio network. This provides the benefit of allowing a single control apparatus to be used to configure multiple audio networks as well as reducing electricity use due to less equipment being needed during operation.

Authentication of third party devices can also be done using asymmetric encryption or other suitable authentication methods, including ones listed within this disclosure. For example, the control apparatus may encrypt an authorization for a third party device within a packet using a first key, whereupon the device decrypts the received authorization using a second key and can determine that the authorization was validly generated by the control apparatus and not some malicious party, wherein the first and second keys are a public and private key pair or vice versa. Alternatively or additionally, the control apparatus may encrypt the details relating to the audio network to be sent to the third party device using a first key, whereupon the third party device may decrypt the received information using a second key, wherein the first and second keys are a public and private key pair or vice versa.

In at least some of the embodiments presented within this disclosure, the third party device may not have exact knowledge of the device profile settings of a device. However, the present system allows for the third party device to activate the profiles of a device, subject to the permissions granted to the third party device. This is beneficial as the exact filters or parameters do not need to be transmitted to or parsed by the third party device, but complex filters within a device may still be activated by said third party device. Further, the third party device may also activate system-level profiles as well as zone-level profiles by simply indicating to the devices which device profile to use. The third party device may thus alter the behaviour of the system significantly by sending relatively simple control messages, which has the beneficial effect of reducing the hardware requirements and battery consumption of the third party device.

Figure 7A:
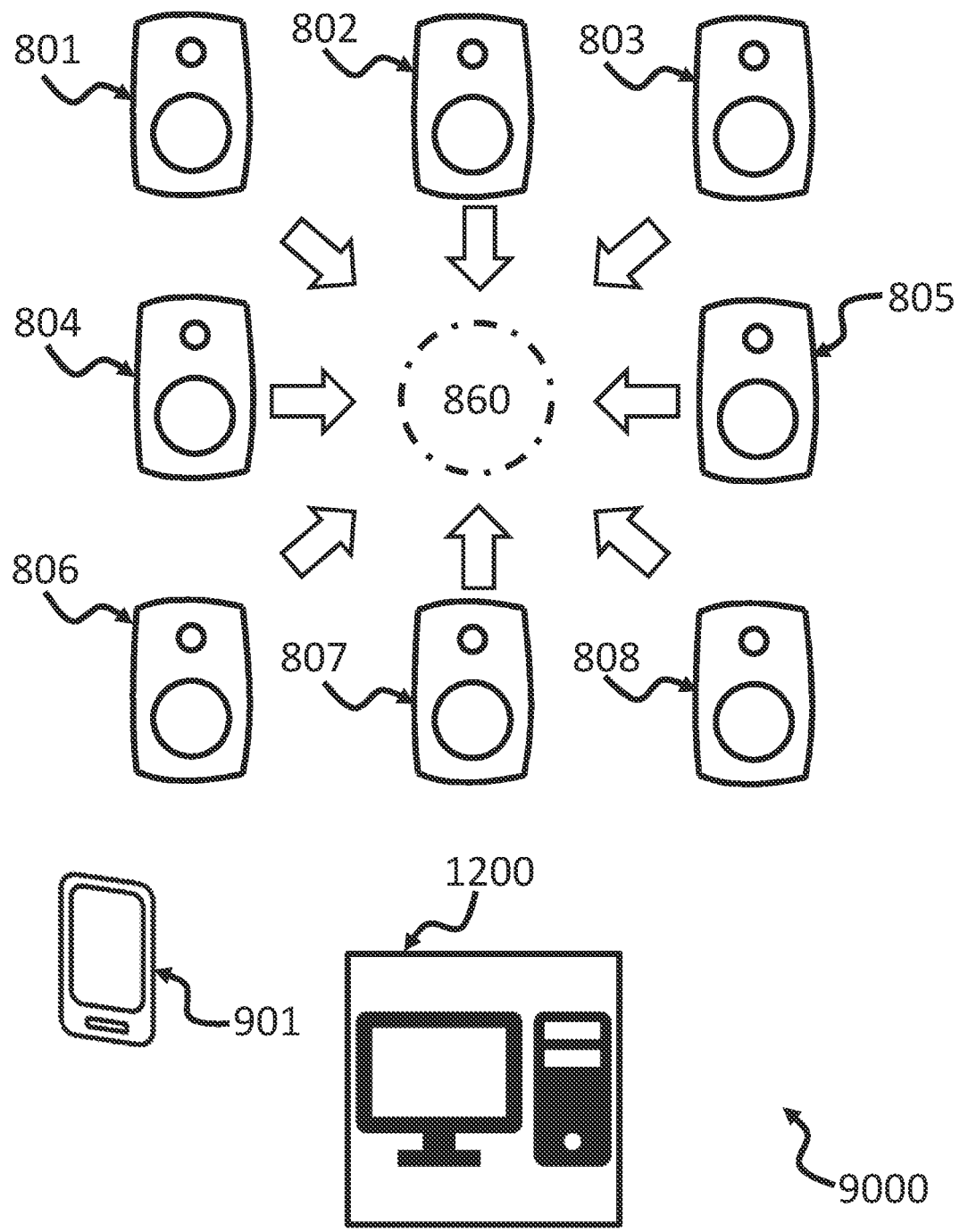
FIGS. 7A, 7B and 7C illustrate exemplary audio system use cases in accordance with at least some embodiments of the present disclosure.
Figure 7B:
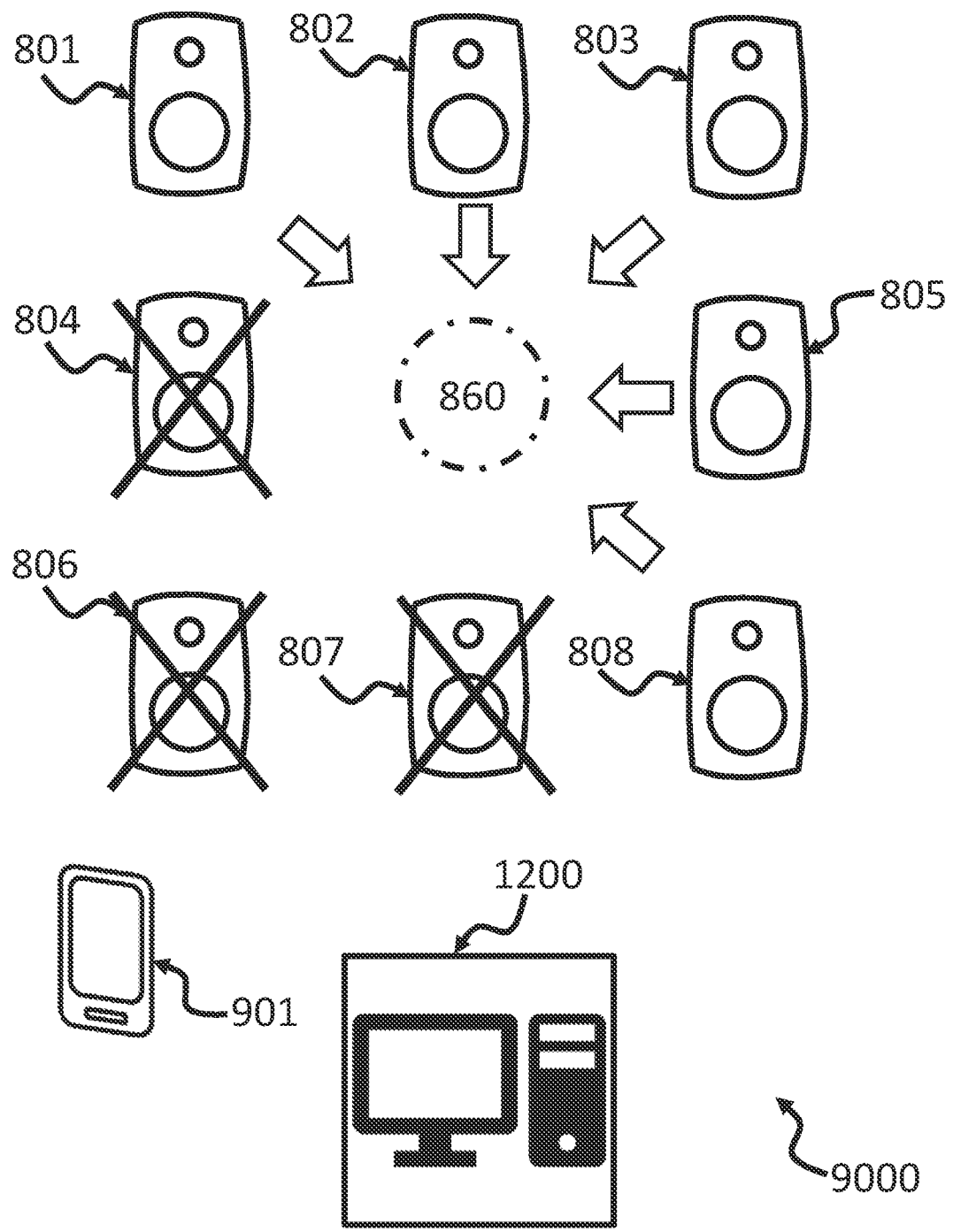
Figure 7C:
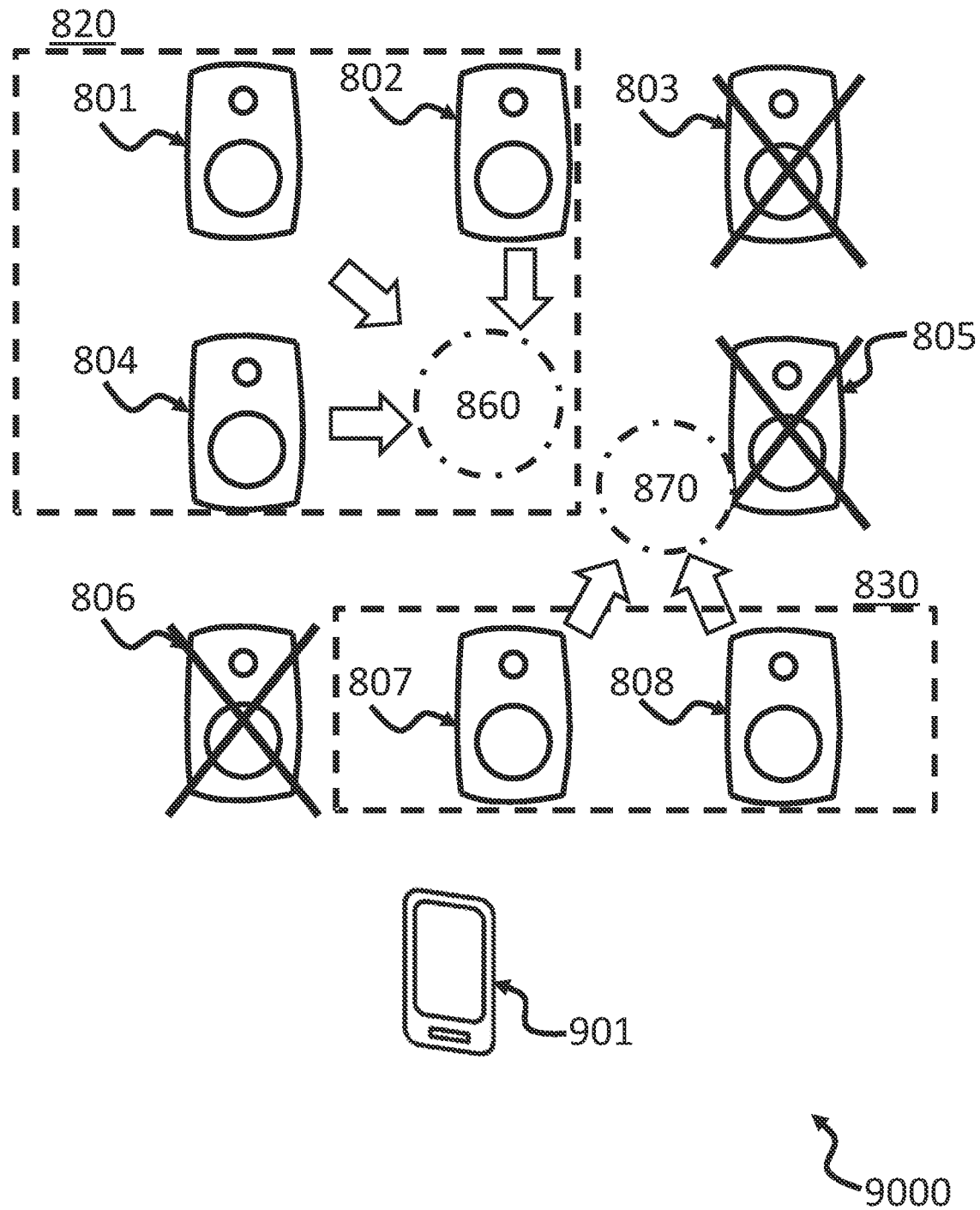

FIGS. 7A, 7B and 7C illustrate further embodiments in accordance with the present invention. In the figures, sound emitted from the loudspeakers is depicted with arrows. Loudspeakers not emitting sound are overlaid with an X-symbol. Finally, the connections of the audio network and the associated devices are not shown for the sake of clarity. Said connections may be any suitable connection means.

In FIG. 7A, an audio system 9000 comprising loudspeakers 801, 802, 803, 804, 805, 806, 807, 808 and control apparatus 1200 and third party device 901 is shown. The audio system 9000 is located within a physical space and the audio system may have a first listening position 860. For example, if the physical space is a room, the speakers may be arranged so that there is one speaker in each corner and additionally one speaker on the middle point of each wall, for a total of eight speakers. The listening spot is then for example in the center of the room. In FIG. 7A, all speakers are in use reflecting a 8.0 or 7.1 surround setup, dependent on which types of speakers are used within the system.

The control apparatus 1200 as well as the third party device 901 are connected to the audio network via suitable means and may be used to adjust or alter the system, zone and device operation as disclosed herein. Such an adjustment to the audio system 9000 is depicted in non-limiting exemplary FIG. 7B, wherein the control apparatus 1200 or third party device 901 has multicasted a command instructing the speakers 801, 802, 803, 805 and 808 to operate in a system-level profile comprising a configuration wherein speakers 802, 803, 805 are center channel speakers, speaker 801 is the left channel and speaker 808 is the right channel. The configuration could be used for example in a presentation situation wherein the stage is located in front of speaker 803. In said multicasted command, speakers 804, 806 and 807 have been instructed to not emit audio, i.e. they are in standby mode. The benefit of this type of control is that the optimal listening position, which is always subject to room responses, can be shifted at will without hardware changes. A reason to shift the listening position may be a change in audience size, for example, or in the use case of the audio system.

FIG. 7C depicts a non-limiting exemplary embodiment in accordance with FIGS. 7A and 7B, wherein audio system 9000 is adjusted using zone level controls. Zones 820 and 830 have been set up within the audio system, zone 820 comprising speakers 801, 802 and 804 and zone 830 comprising speakers 807 and 808. In the situation shown in FIG. 7C, the control apparatus 1200 or third party device 901 has multicasted a command instructing the devices within zone 820 to operate in a 2.1 configuration, wherein speaker 804 is the left channel, speaker 802 is the right channel and speaker 801 is a low-frequency speaker. In the said multicasted command or in a subsequent command, speakers within zone 830 are instructed to operate in stereo mode, wherein 807 is the right channel and 808 the left channel. Speakers 806, 803 and 805 do not belong to said zone and are not used within this example. This situation illustrates how a system may have at least two listening positions, namely positions 860 and 870. In a further exemplary embodiment, audio emitted from zones 820 and 830 is different audio, i.e. different media is being reproduced.

It is understood that changing between the situations shown in FIG. 7A or 7B or 7C or other such situations is easily achievable by multicasting a control signal comprising instructions to that effect. In addition, as is seen from the figure, the control apparatus 1200 may be temporarily or permanently removed from the audio system 9000, whereupon third party device 901 may be used to alter the behaviour of the devices, the zones or the system, even though device 901 does not necessarily have the detailed information relating to the contents of the system-level, zone level, or device profiles. In fact, in a further exemplary embodiment, the device 901 only has the profile numbers of the profiles within the system, e.g. stereo mode profile 2, surround mode profile 3, et cetera.

In at least some of the embodiments in accordance with this disclosure, initial configuration of devices may be done automatically, for example after the automatic addition as discussed with respect to FIG. 4A. After that process, the newly added device may request an initial configuration comprising at least one profile from controlling apparatus 1000. Controlling apparatus may prompt the user to provide such a configuration, or subject to a setting comprised in the controlling apparatus, controlling apparatus may automatically assign the device configuration based at least one of the following: order of addition, device name, device type, ping or age of packets sent to or from the device. The device will store the configuration as discussed within this disclosure. For example, if the user is setting up a specific zone, the added device may be automatically added into that zone subject to settings within the controlling apparatus.

In a situation wherein the controlling apparatus is not present or wherein the controlling apparatus is configured to not provide the initial configuration, the device may request a profile from at least one second device within the audio network. The device may select the at least one second device based on at least one of the following: device name, device type, ping or age of packets sent to or from the device. For example, when configuring audio systems of more than a hundred speakers, the speaker nearest to the added speaker may have very similar settings which are usable for the added speaker.

Figure 8:
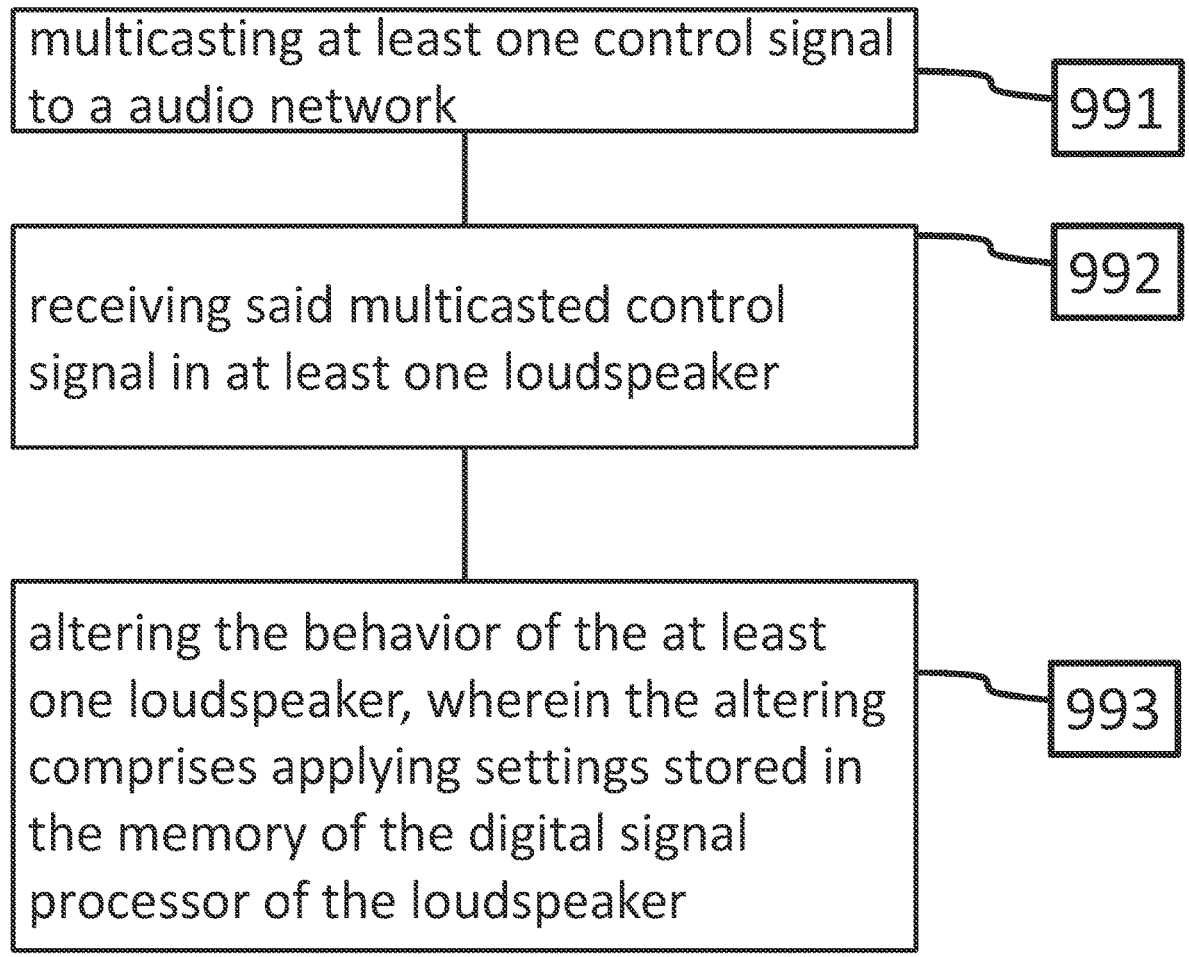
FIG. 8 illustrates an exemplary flow graph of methods in accordance with at least some embodiments of the present disclosure.

FIG. 8 illustrates an exemplary method in accordance with at least some embodiments of the present invention. In the exemplary method, step 991 comprises multicasting a control signal in accordance with the present disclosure to an audio network, step 992 comprises receiving said control signal, and step 993 comprises the alteration of behaviour of the at least one loudspeaker within the network.

Advantages of the present disclosure include at least the ability to control a large number of loudspeakers within the audio network, in particular more than 10 loudspeakers, more specifically more than 20 loudspeakers and in an exemplary embodiment more than 100 loudspeakers. The presented solution provides an efficient method for reconfiguring the loudspeakers from a central location using the control apparatus without the need for physical hardware changes. In addition, the solution provides a secure way to allow third party devices to control at least subsets of the audio network with a solution which does not strain the audio network or the third party device due to the simplicity of the control process after setup. Also, the present solution allows granular control of at least one device when using the control apparatus or, when a third party device is used, profile-level control of at least one device without the need for the third party device to have the exact details regarding the profile. Further, as the device settings are not transferred to the third party device, the amount of data transferred within the system is reduced which prevents network congestion.

Further, the disclosed solution provides a benefit with respect to audio systems comprising a large number of speakers, such as more than ten speakers or more than 20 speakers, as the scale of system capabilities can grow while the setup and control process is does not grow in equal relation, i.e. the system setup will no longer necessarily be a linear relation of number of speakers multiplied by the setup time of a single speaker. Additionally, in embodiments using power over Ethernet—equipped speakers, the amount of wiring is greatly reduced which in turn reduces the amount of cable installation required.

The control apparatus may be comprised in at least one of the following: at least one computing device such a server, node or cloud computing device; a personal computer, a server, a mobile phone, a smartphone, a tablet device, a smart watch, an item of smart jewelry or any type of suitable electronic device.

Comprised in the control apparatus or computing device is a processor, which may comprise, for example, a single- or multi-core processor wherein a single-core processor comprises one processing core and a multi-core processor comprises more than one processing core. The processor may comprise more than one processor. A processing core may comprise, for example, a Cortex-A8 processing core by ARM Holdings or a Steamroller processing core produced by Advanced Micro Devices Corporation. The processor may comprise at least one Qualcomm Snapdragon and/or Intel Core processor, for example. The processor may comprise at least one application-specific integrated circuit, ASIC. The processor may comprise at least one field-programmable gate array, FPGA. The processor may be a means for performing method steps in the computing device. The processor may be configured, at least in part by computer instructions, to perform actions.

In the context of the present disclosure, it is understood that the control apparatus may comprise several devices in cooperation. Devices such as loudspeakers, microphones and network interfaces may interface with each other and external computing devices using at least one of the following technologies: direct wiring such as electrical wires, coaxial cable, fiber optic cable, wireless local area network, WLAN, Ethernet, universal serial bus, USB, and/or worldwide interoperability for microwave access, WiMAX, standards, and satellite communication methods, for example. Alternatively or additionally, a proprietary communication framework may be utilized. In some embodiments, separate networks may be used for one or more of the following purposes: communication between loudspeakers, communication between loudspeakers and network interfaces, communication between network interfaces and servers, et cetera.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In this description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

In at least some embodiments in accordance with the present disclosure, an audio network comprising a system for controlling loudspeakers is provided in accordance with the following clauses 1-13.

Clause 1. A system for controlling loudspeakers, the system comprising at least one loudspeaker comprising a speaker element and a digital signal processor, and at least one control apparatus comprising at least one processing core and at least one memory including computer program code, the at least one memory and the computer program code being configured to multicast a control signal, and wherein the at least one loudspeaker is configured to at least: receive said multicasted control signal, and alter its behavior in response to the said control signal, wherein the altering of the behavior comprises applying settings stored in the memory of the digital signal processor of the loudspeaker.

Clause 2. A system according to clause 1, wherein the multicasted control signal comprises instructions to assign one or more loudspeakers into one or more logical zones and wherein the control apparatus may multicast zone-specific control signals, said zone-specific control signals changing the behavior of each loudspeaker in a given logical zone.

Clause 3. A system according to any preceding clause, wherein the multicasted control signal may comprise instructions to allow a third party device to control the loudspeaker, wherein the instructions may comprise port details for an incoming control signal from said third party device.

Clause 4. A system according to any preceding clause, the system further comprising at least one third party device, wherein the third party device is configured to send a multicasted control signal.

Clause 5. A system according to any preceding clause, wherein the loudspeaker is configured to respond to the control signal by sending a security challenge to the control apparatus, and to receive a security response from the control apparatus, wherein the loudspeaker is configured to evaluates the response and, if the response is correct, alters its behavior in accordance with the control signal.

Clause 6. A system according to any preceding clause, wherein subsequent to the reception of the multicasted control signal by the loudspeaker, the loudspeaker is configured to continues operation without further control signals.

Clause 7. A system according to any preceding clause, wherein the control signal is comprised in an user datagram protocol, UDP, packet.

Clause 8. A system according to any preceding claim, wherein the loudspeaker is powered by Power over Ethernet, POE.

Clause 9. A system according to any preceding clause, wherein the system comprises more than 2 loudspeakers, preferably more than 6 loudspeakers, in particular more than 10 loudspeakers.

Clause 10. A system according to any preceding clause, wherein the settings stored in the memory of the digital signal processor is configured to store the settings of the loudspeaker, the settings comprising factory calibrated settings of the digital signal processor of the loudspeaker comprise factory calibrated settings.

Clause 11. A system according to any preceding clause, wherein the settings stored in the memory of the digital signal processor of the loudspeaker comprise at least one of the following: input mode, mix mode, audio over internet protocol settings, room correction filter, delay, frequency range volume setting, a lowpass filter, a high pass filter, a notch shelving filter, a wide bandwidth roll-off using one or more shelving filters, a first-order filter function, a second-order filter function.

Clause 12. A system according to any preceding clause, wherein the control signal may comprise a request for diagnostic information.

Clause 13. A system according to any preceding clause, wherein at least one second speaker may request settings stored in the memory of the digital signal processor of the loudspeaker, and upon receiving said settings, alter its behavior in response to the said control signal, wherein the altering of the behavior comprises applying said settings.

INDUSTRIAL APPLICABILITY

At least some embodiments of the present invention find industrial application in audio engineering.

ACRONYMS LIST

AES Advanced encryption standard
AOIP Audio over Internet protocol
DNS Domain name system
DHCP Dynamic host configuration protocol
EMI Electromagnetic interference
IP Internet Protocol
IPv4, IPv6 Internet Protocol version 4 or version 6
LAN Local area network
mDNS Multicast domain name system
PC Personal computer
POE Power over Ethernet
RSA Rivest Shamir Adleman (encryption)
TCP Transmission Control Protocol
TTL Time to live
UDP User datagram protocol

REFERENCE SIGNS LIST

100 Loudspeaker
111 Digital signal processor
112, 114 Amplifier
113, 115 Speaker element
2000, 9000 Loudspeaker system, audio network
1000, 1200 Control apparatus
501, 502, 601, 603, 701, 702 Loudspeakers
710, 610, 510 Connection means
711 Router or hub
900, 901 Third party device
500, 600, 700 Logical zone
3000 Packet
3001 Internet protocol header
3002 UDP header
3003 Payload of packet
3101, 3102, 3103, 3104, 3104 Packet
3111, 3112, 3113, 3114 Packet
3121, 3122, 3123, 3124 Packet
3131, 3132, 3133 Packet
3141, 3142, 3143 Packet
3151, 3152, 3153, 3154 Packet
801, 802, 803, 804, 805, 806, Loudspeaker
807, 808
860, 870 Listening location

The invention claimed is:

1. A controllable loudspeaker, the loudspeaker comprising a speaker element and a digital signal processor comprising at least one processing core and at least one memory including computer program code, the at least one memory and the computer program code being configured to:
receive a multicasted control signal comprising instructions to authorize a third party device to control the loudspeaker, wherein the instructions comprise port details for an incoming control signal from said third party device, and
alter the behavior of the loudspeaker in response to the multicasted control signal, wherein the altering of the behavior comprises applying settings stored in the memory of the digital signal processor of the loudspeaker.

2. The loudspeaker according to claim 1, wherein the multicasted control signal comprises instructions to assign one or more loudspeakers into one or more logical zones and wherein the multicasted control signal comprises zone-specific control signals changing the behavior of each loudspeaker in a given logical zone.

3. The loudspeaker according to claim 1, wherein the instructions comprise a permission level with respect to the third party device, wherein the permission level defines which loudspeaker functions the third party device is authorized to control.

4. The loudspeaker according to claim 1, wherein the loudspeaker is configured to receive a multicasted control signal from at least one third party device or second control apparatus.

5. The loudspeaker according to claim 1, wherein the loudspeaker is configured to respond to the control signal by sending a security challenge to the control apparatus, and to receive a security response from the control apparatus, wherein the loudspeaker is configured to evaluate the response and, if the response is correct, alter its behavior in accordance with the control signal.

6. The loudspeaker according to claim 1, wherein subsequent to the reception of the multicasted control signal by the loudspeaker, the loudspeaker is configured to continue operation without further control signals.

7. The loudspeaker according to claim 1, wherein the multicasted control signal is comprised in an user datagram protocol, UDP, packet.

8. The loudspeaker according to claim 1, wherein the loudspeaker is powered by power over ethernet, POE.

9. The loudspeaker according to claim 1, wherein the memory of the digital signal processor is configured to store the settings of the loudspeaker, the settings comprising factory calibrated settings.

10. The loudspeaker according to claim 1, wherein the settings stored in the memory of the digital signal processor of the loudspeaker comprise at least one of the following: input mode, mix mode, audio over internet protocol settings, room correction filter, delay, frequency range volume setting, a lowpass filter, a high pass filter, a notch shelving filter, a wide bandwidth roll-off using one or more shelving filters, a first-order filter function, a second-order filter function.

11. The loudspeaker according to claim 1, wherein the control signal may comprises a request for diagnostic information.

12. The loudspeaker according to claim 1, wherein the loudspeaker is configured to request settings stored in the memory of the digital signal processor of at least one second loudspeaker, and upon receiving said settings, alter its behavior in response to receiving said settings, wherein the altering of the behavior comprises applying said settings.

13. A control apparatus comprising at least one processing core and at least one memory including computer program code, the at least one memory and the computer program code being configured to multicast a control signal comprising instructions to authorize a third party device to control at least one loudspeaker, wherein the instructions comprise port details for an incoming control signal from said third party device to said at least one loudspeaker, said loudspeaker being configured to at least receive said multicasted control signal, and alter its behavior in response to the multicasted control signal, wherein the altering of the behavior comprises applying settings stored in the memory of the digital signal processor of the loudspeaker.

14. A method for controlling loudspeakers, the method comprising
using a control apparatus, multicasting at least one control signal comprising instructions to authorize a third party device to control at least one loudspeaker, wherein the instructions comprise port details for an incoming control signal from said third party device, and
receiving said multicasted control signal in at least one loudspeaker,
wherein the at least one loudspeaker is configured to alter its behavior in response to the at least one control signal, wherein the altering of the behavior comprises applying settings stored in the memory of the digital signal processor of the loudspeaker.

15. The method according to claim 14, wherein the multicasted control signal may additionally or alternatively be sent by a third party device.

16. The method according to claim 14, wherein the multicasted control signal comprises instructions to assign one or more loudspeakers into one or more logical zones and wherein the control apparatus may multicast zone-specific control signals, said zone-specific control signals changing the behavior of each loudspeaker in a given logical zone.

17. The method according to claim 14, wherein the loudspeaker comprises a speaker element and a digital signal processor comprising at least one processing core and at least one memory including computer program code, the at least one memory and the computer program code being configured to:
receive the multicasted control signal, and
alter the behavior of the loudspeaker in response to the multicasted control signal, and
wherein the control apparatus comprises at least one processing core and at least one memory including computer program code, the at least one memory and the computer program code being configured to multicast said control signal.

18. The method according to claim 14, wherein the instructions further comprise a permission level with respect to the third party device, wherein the permission level defines which loudspeaker functions the third party device is authorized to control.

* * * * *